US011017313B2

(12) United States Patent
Boss et al.

(10) Patent No.: US 11,017,313 B2
(45) Date of Patent: May 25, 2021

(54) SITUATIONAL CONTEXT ANALYSIS PROGRAM

(71) Applicant: International Business Machines Corporation, Armonk, NY (US)

(72) Inventors: Gregory J. Boss, Saginaw, MI (US); Andrew R. Jones, Round Rock, TX (US); Charles S. Lingafelt, Durham, NC (US); Kevin C. McConnell, Austin, TX (US); John E. Moore, Jr., Brownsburg, IN (US)

(73) Assignee: International Business Machines Corporation, Armonk, NY (US)

( * ) Notice: Subject to any disclaimer, the term of this patent is extended or adjusted under 35 U.S.C. 154(b) by 1281 days.

(21) Appl. No.: 15/055,729

(22) Filed: Feb. 29, 2016

(65) Prior Publication Data

US 2017/0249552 A1 Aug. 31, 2017

(51) Int. Cl.
*G06N 20/00* (2019.01)
*G06F 16/9537* (2019.01)
*G06N 5/04* (2006.01)

(52) U.S. Cl.
CPC ......... *G06N 20/00* (2019.01); *G06F 16/9537* (2019.01); *G06N 5/04* (2013.01)

(58) Field of Classification Search
CPC ........ G06F 20/00; G06F 16/9537; G06N 5/04
See application file for complete search history.

(56) References Cited

U.S. PATENT DOCUMENTS

| 6,928,614 | B1 | 8/2005 | Everhart |
| 7,603,273 | B2 | 10/2009 | Poirier |
| 8,347,360 | B2 | 1/2013 | Schultz et al. |
| 2008/0228479 | A1 | 9/2008 | Prado |
| 2012/0278078 | A1 | 11/2012 | Ricci et al. |
| 2014/0146953 | A1 | 5/2014 | Sepic |
| 2014/0351837 | A1 | 11/2014 | Amidei et al. |

(Continued)

FOREIGN PATENT DOCUMENTS

WO 1988004463 A1 6/1988

OTHER PUBLICATIONS

Krause et al, "Context-Aware Mobile Computing: Learning Context-Dependent Personal Preferences from a Wearable Sensor Array", Feb. 2006, IEEE Transactions on Mobile Computing, vol. 5, No. 2, all pages (Year: 2006).*

(Continued)

*Primary Examiner* — Daniel C Puentes
(74) *Attorney, Agent, or Firm* — Christopher McLane; Jordan A. Lewis

(57) ABSTRACT

In an approach for providing a response based on situational context, a computer determines that an individual is within a proximity of a computing device. The computer identifies an identity associated with the determined individual within the proximity of the computing device. The computer determines a location associated with the identified identity. The computer identifies an entry within a table based on at least in part on the identified identity and the determined location. The computer determines a stimulus associated with the identified entry occurs. The computer provides a response based on determining the stimulus associated with the identified entry occurs.

20 Claims, 5 Drawing Sheets

(56) References Cited

U.S. PATENT DOCUMENTS

2015/0109128 A1* 4/2015 Fadell .................... G08B 3/10
                                                                 340/540

OTHER PUBLICATIONS

"Contextual Asking and Answering of Questions During a Recorded Training Audio or Video", An IP.com Prior Art Database Technical Disclosure, Authors et. al.: Disclosed Anonymously, IP.com No. 000236361, Apr. 22, 2014, 7 pages.

"Detection and Reaction to Contextual Information based on analysis of a Live Data Stream", An IP.com Prior Art Database Technical Disclosure, Authors et. al.: Disclosed Anonymously, IP.com No. 000196971, Jun. 22, 2010, 6 pages.

"Method and System for Dynamically Providing Contextual Content to User for Producing a Write-up", An IP.com Prior Art Database Technical Disclosure, IP.com No. 000197523, Jul. 13, 2010, 6 pages.

"Method and System for Performing Contextual Searching through Audio Recordings", An IP.com Prior Art Database Technical Disclosure, Authors et. al.: Disclosed Anonymously, IP.com No. 000208112, Jun. 23, 2011, 4 pages.

* cited by examiner

| ENTRY NUMBER | IDENTITY | LOCATION | PRIORITY | RESPONSE METHOD | STIMULUS | RESPONSE |
|---|---|---|---|---|---|---|
| 1 | SPOUSE | HOME | 7 | STATIC RESPONSE | PROXIMITY | SUSPEND APPLICATION |
| 2 | SPOUSE | CAR | 6 | HISTORICAL ACTIVITY LEARNING | TURN OFF AUDIO | OPEN NEARBY ATTRACTION APPLICATION |
| 3 | CHILD | HOME | 8 | HISTORICAL ACTIVITY LEARNING | OPENS WEB BROWSER | OPEN TV GUIDE |
| 4 | COWORKER | WORK | 4 | HISTORICAL ACTIVITY LEARNING | SELECTS EMAIL CLIENT | OPEN E-MAILS FROM COWORKER |
| 5 | COWORKER | CAR | 5 | KEY WORD LEARNING | "HOCKEY", "SCORE", "TEAM" | SELECTS SPORTS RADIO STATION |
| 6 | MANAGER | WORK | 2 | STATIC RESPONSE | PROXIMITY | OPEN MOST RECENT STATUS REPORT |
| 7 | PROGRAM MANAGER | WORK | 3 | KEY WORD LEARNING | "CLIENT" | OPEN CLIENT FOLDER |
| 8 | CLIENT | ANY | 1 | STATIC RESPONSE | PROXIMITY | OPEN CLIENT PROGRESS FILE |
| 9 | * | * | 9 | KEY WORD LEARNING | "RESTAURANT", "LUNCH", "DINNER" | OPEN RESTAURANT FINDER APPLICATION |

FIG. 3A

SITUATIONAL CONTEXT ANALYSIS PROGRAM

BACKGROUND

The present invention relates generally to the field of situational awareness, and more particularly to applying contextual information to situational awareness information to initiate a response.

Situational awareness is a perception of environmental elements with respect to time or space, comprehension of associated meanings, and projection of status after a variable changes. Situational awareness involves an awareness of activities occurring within an associated vicinity in order to evaluate the manner in which information, events, and actions impact goals and objectives. While situational awareness can include an extended framework (e.g., objects, frames, implications, event horizons, etc.), the basic steps to achieve situational awareness are perception, comprehension, and projection. Perception perceives the status, attributes, and dynamics of relevant elements in the environment through monitoring, cue detection, and simple recognition, resulting in an awareness of multiple situational elements (e.g., objects, events, people, system, environmental factors, etc.) and associated states (e.g., locations, conditions, modes, actions, etc.). Comprehension integrates disjointed situational elements though pattern recognition, interpretation, and evaluation in order to understand impacts on goals and objectives. Projection involves the ability to project future actions of the elements in the environment by understanding the status and dynamics of the elements, comprehension of the situation, and extrapolating the information forward to determine effects on future states of the operational environment.

Speech recognition is an inter-disciplinary sub-field of computational linguistics that enables recognition and translation of a spoken language into text by computing devices. Some speech recognition systems utilize training (e.g., enrollment) where a speaker reads text or isolated vocabulary into the speech recognition system. The speech recognition system analyzes the specific voice of the speaker and fine-tunes the speech recognition system for increased accuracy of speech associated with the speaker. The term voice recognition or speaker identification refers to identifying the speaker, rather than what the speaker is saying. Speaker recognition identifies a speaker from characteristics of voices (e.g., voice biometrics). Speaker recognition systems includes an enrollment and a verification phase. During enrollment, the speaker recognition system records the voice of the speaker and extracts a number of features in order to form a voice print, template, or model. In the verification phase, the speaker recognition system compares a speech sample or "utterance" against a previously created voice print. For identification, the speaker recognition system compares the utterance against multiple voice prints to determine the best match or matches and verification compares the utterance against a single voice print.

SUMMARY

Aspects of the present invention disclose a method, computer program product, and system for providing a response based on situational context. The method includes one or more computer processors determining that an individual is within a proximity of a computing device. The method further includes one or more computer processors identifying an identity associated with the determined individual within the proximity of the computing device. The method further includes one or more computer processors determining a location associated with the identified identity. The method further includes one or more computer processors identifying an entry within a table based on at least in part on the identified identity and the determined location. The method further includes one or more computer processors determining a stimulus associated with the identified entry occurs. The method includes one or more computer processors a response based on determining the stimulus associated with the identified entry occurs.

BRIEF DESCRIPTION OF THE DRAWINGS

FIG. 3A is an example of a response method table, in accordance with an embodiment of the present invention;

DETAILED DESCRIPTION

When in business, domestic, and/or social settings users perform and initiate tasks based on personal preferences, interests, goals, work assignments, etc. However, as recognized by embodiments of the present invention, when a new individual enters the vicinity of a user, the task the user is performing may no longer be relevant and/or a priority, with respect to personal preferences, interests, goals, work assignments etc. of the new individual. Embodiments of the present invention determine when a new individual enters the vicinity of a user, and renders relevant information to the user with respect to the new individual for utilization. Embodiments of the present invention provide responses to stimulus based on proximity, keywords, or user actions when the new individual enters the vicinity without necessitating an action by the user. Embodiments of the present invention learn responses based on actions initiated by the user of a computing device after an individual enters the vicinity of the user that result in an update to previously stored actions. After learning the responses, embodiments of the present invention initiate the responses when the new individual enters the vicinity without necessitating an action by the user. Additionally, embodiments of the present invention learn keywords spoken by the new individual and correlate the keywords with the actions initiated by the user that result in an update to previously stored keywords. After learning the keywords, embodiments of the present invention initiate the responses when the new individual enters the vicinity and speaks the keywords without necessitating an action by the user.

Figure 1:
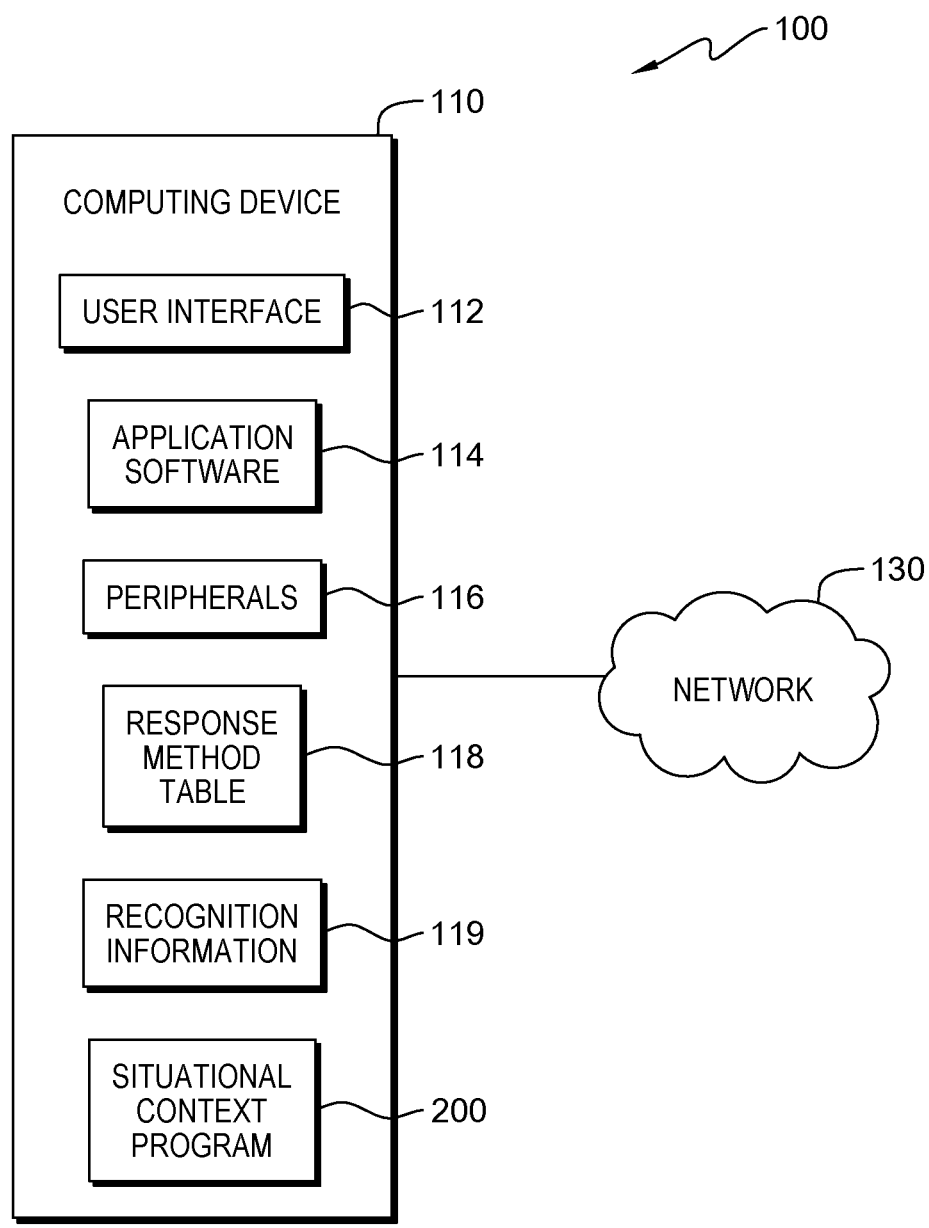
FIG. 1 is a functional block diagram illustrating a situational awareness environment, in accordance with an embodiment of the present invention.

The present invention will now be described in detail with reference to the Figures. FIG. 1 is a functional block diagram illustrating a situational awareness environment, generally designated 100, in accordance with one embodiment of the present invention. FIG. 1 provides only an illustration of one embodiment and does not imply any limitations with regard to the environments in which different embodiments may be implemented.

In the depicted embodiment, situational awareness environment 100 includes computing device 110. In another embodiment, situational awareness environment 100 includes computing device 110 and a server (not shown) interconnected over network 130. Situational awareness environment 100 may include additional computing devices, mobile computing devices, servers, computers, storage devices, networks, or other devices not shown.

Computing device 110 may be a web server or any electronic device or computing system capable of processing program instructions and receiving and sending data. In some embodiments, computing device 110 may be a laptop computer, a tablet computer, a netbook computer, a personal computer (PC), a desktop computer, a personal digital assistant (PDA), a smart phone, or any programmable electronic device capable of communicating with network 130. In other embodiments, computing device 110 may represent a server computing system utilizing multiple computers as a server system, such as in a cloud computing environment. In general, computing device 110 is representative of any electronic device or combination of electronic devices capable of executing machine readable program instructions as described in greater detail with regard to FIG. 4, in accordance with embodiments of the present invention. Computing device 110 contains user interface 112, application software 114, peripherals 116, response method table 118, recognition information 119, and situational context program 200 as depicted and described in further detail with respect to FIG. 4.

User interface 112 is a program that provides an interface between a user of computing device 110 and a plurality of applications that reside on computing device 110 (e.g., application software 114, situational context program 200, etc.). A user interface, such as user interface 112, refers to the information (e.g., graphic, text, sound) that a program presents to a user and the control sequences the user employs to control the program. A variety of types of user interfaces exist. In one embodiment, user interface 112 is a graphical user interface. A graphical user interface (GUI) is a type of interface that allows users to interact with peripheral devices (i.e., external computer hardware that provides input and output for a computing device, such as a keyboard and mouse) through graphical icons and visual indicators as opposed to text-based interfaces, typed command labels, or text navigation. The actions in GUIs are often performed through direct manipulation of the graphical elements. User interface 112 sends and receives information to application software 114 and situational context program 200.

Application software 114 is a set of one of more programs designed to carry out the operations for a specific application to assist a user to perform an activity (e.g., word processing programs, spread sheet programs, media players, web browsers). In the depicted embodiment, application software 114 resides on computing device 110. In another embodiment, application software 114 may reside on a server or on another device (not shown) connected over network 130. In one embodiment, application software 114 initiates in response to user actions via user interface 112. In another embodiment, application software 114 initiates in response to situational context program 200 (e.g., situational context program 200 sends a message to application software 114 to open a file).

Peripherals 116 include input devices that interact with and/or send data to computing device 110 (e.g., mouse, keyboard, microphone, fingerprint scanner, near field communication (NFC) chip reader, webcams, etc.). In general, peripherals 116 are internal or external devices that connect directly to computing device 110 but do not contribute to the primary function of computing device 110 but enable users to access and use the functionalities of computing device 110. Peripherals 116 connect to computing device 110 through I/O interfaces (e.g., communications (COM), Universal Serial Bus (USB) and serial ports). Peripherals 116 receives information associated with situational awareness environment 100 (e.g., detects: voices, personal area network connections, NFC chips, radio frequency identification (RFID) etc.) and provides the information to situational context program 200. For example, peripherals 116 include a microphone that detects a voice when within range of the microphone. Peripherals 116 sends the voice data to situational context program 200 for utilization. In the depicted embodiment, peripherals 116 are internal devices that reside on computing device 110. In another embodiment, peripherals 116 are external devices connected to computing device 110. In some other embodiment, peripherals 116 are an external device that connects to computing device 110 over network 130. Peripherals 116 send and receive information to application software 114 and situational context program 200.

Figure 3B:
FIG. 3B is an example of a response method table incorporating updates to the stimulus and/or response fields, in accordance with an embodiment of the present invention.

Response method table 118 (e.g., response method table 300, response method table 350) is an organized collection of data (e.g., table, database, etc.) regarding individuals with respect to an entry number field, an identity field, a location field, a priority field, a response method field, a stimulus field, and a response field, as depicted and explained in greater detail with respect to FIG. 3A and FIG. 3B. Response method table 118 interacts with the user and situational context program 200 to capture, analyze data, and provide responses. Initial data within response method table 118 is set by the user of computing device 110 through user interface 112. In one embodiment, the user sets the identity, location, priority, response method, stimulus, and response. In some embodiments, the user may also set duration fields that indicates the amount of time that can elapses prior to providing a response and/or prior to re-evaluating. For example, the duration fields include a minimum time that situational context program 200 determines an identity is within proximity of computing device 110 prior to providing a response (i.e., prevents false detections and providing unnecessary responses). Additionally, a maximum and/or minimum time duration allows situational context program 200 to re-evaluate after providing a response or not providing a response when an individual remains in proximity, a new individual enters proximity, and/or an individual is no longer in proximity. The duration fields may be applied across all entries, to groups of entries, or set for each individual entry within response method table 118. In one embodiment, response method table 118 resides on computing device 110. In another embodiment, response method table 118 resides on a server or on another device (not shown) connected over network 130 provided response method table 118 is accessible by the user and situational context program 200.

The identity field within response method table 118 includes a descriptor (e.g., name, title, distinguishing feature, etc.) that differentiates an individual from other individuals. In some embodiments, the identity field includes an unspecified identity (e.g., wild card, "*") that allows situational context program 200 to apply the entry to any individual in proximity (e.g., individuals identified in response method table 118 and unidentified individuals not entered in response method table 118). For example, within entry nine of response method table 300, the identity is set to "*," therefore, any identity within response method table 118 and/or not identified within response method table can speak the stimulus of "restaurant," "lunch," or "dinner" and situational context program 200 initiates the response to "open restaurant finder application." The location field within response method table 118 assigns a place or position (e.g., global positioning system coordinates, location label, address, etc.) that provides where the individual may be encountered. In some embodiments, the location field may include an unspecified location (e.g., wild card, "*", any, etc.) that allows situational context program 200 to apply the entry without a specific location (i.e., applies to any location in which situational context program 200 is active on computing device 110 and associated with the user). For example, a cell phone is associated with a specific user and does not include a fixed location. By setting the location field to a wild card for an identity, when situational context program 200 detects the identity, situational context program 200 initiates the corresponding response. The identity field and location field may include duplicate information in one of the two fields (e.g., duplicate identity or duplicate location) unless the identity and location are set to unspecified (e.g., wild card status). Therefore, the combination of the identity field and the location field are unique and include a unique priority. For example, the identity field for entry number 1 and entry number 2 in response method table 300 are both "spouse", however, the location for entry number 1 is "home" and for entry number 2 is "car". Therefore, the combination of the identity field and location field are different as entry number 1 is "spouse"+"home" and entry number 2 is "spouse"+"car". Priority field is a unique number assigned to each entry that indicates the order of importance of each identity with respect to other identities within response method table 118. In the case of a wild card assignments for both identity and location, the priority associated with the entry remains unique and is not shared with another entry within.

The response method field within response method table 118 includes static response method, historical learning method, and keyword learning method which links to the stimulus field and response field. The static response method is characterized by a stimulus and response, set by the user that does not change in response to external factors. For example, the user must update the response method table 118 instead of situational context program 200 determining the stimulus and response through a learning method and updating response method table 118. The historical learning method includes a stimulus and a response that are learned by situational context program 200 by monitoring actions of the user on computing device 110 when an identity is within proximity to the user. The keyword learning method includes a stimulus and response that are based on correlating keywords spoken by an identity with user actions when the identity is in proximity of the user.

The stimulus field within response method table 118 includes the information or trigger conditions (e.g., action, distance, sensitivity, keyword(s), etc.) that cause situational context program 200 to initiate the response field (e.g., stimulates an action, cause and effect). In one embodiment, the stimulus is static (e.g., set by the user prior to entering the operational phase.) In another embodiment, the stimulus is dynamic, and situational context program 200 updates the stimulus associated with an identified entry number within response method table 118 after analysis. Further references to "stimulus" are associated with response method table 118, specifically the stimulus section of response method table 118. The response field within response method table 118 includes the reaction that situational context program 200 implements in response to detecting and/or receiving the stimulus. The response within the response field includes one or more of the following: actions that involve application software 114, audio responses, a tactile response (e.g., vibration), visual responses, and additional responses as allowed by the hardware and software associated with computing device 110. In one embodiment, the response is static (e.g., set by the user prior to entering the operational phase.) In another embodiment, the response is dynamic, and situational context program 200 updates the response associated with an identified entry number within response method table 118 after analysis. Further references to "response" are associated with response method table 118, specifically the stimulus section of response method table 118.

Recognition information 119 includes the information that situational context program 200 utilizes to determine an identity. In one embodiment, recognition information 119 is set and/or acquired by a user with interactions with individuals that are included in response method table 118. In another embodiment, situational context program 200 acquires recognition information 119 from a predefined source (e.g., company database). In one embodiment, recognition information 119 includes voice recordings that are associated with an identity that situational context program 200 provides to voice recognition software for analysis and identification. In another embodiment, recognition information 119 includes near field communication (NFC) information for computing devices associated with an identity. In some other embodiment, recognition information 119 includes radio frequency identification in which electromagnetic fields transfer data to automatically identify and track tags attached to objects (e.g., badges) to determine an identity. In yet some other embodiment, recognition information 119 includes connections between computing devices and network 130 (e.g., paired devices on a personal area network). In other embodiments, recognition information 119 includes information and methods known by one skilled in the art for the purpose of determining an identity. In the depicted embodiment, recognition information 119 resides on computing device 110. In another embodiment, recognition information 119 resides on another computing device or server (not shown) connected over network 130 provided recognition information 119 is accessible by the user and situational context program 200.

Network 130 may be a local area network (LAN), a wide area network (WAN) such as the Internet, a wireless local area network (WLAN), a personal area network (PAN), any combination thereof, or any combination of connections and protocols that will support communications between computing device 110, other computing devices and servers (not shown), in accordance with embodiments of the inventions. Network 130 may include wired, wireless, or fiber optic connections.

Situational context program 200 is a program that combines contextual information with situational awareness information in order to provide a response to a user. Situational context program 200 detects when an individual is in proximity to the user of computing device 110 though peripherals 116. Based on data received through peripherals 116, situational context program 200 identifies the individual with identification software that compares the received data to stored data within recognition information 119. Situational context program 200 accesses and retrieves information based on the identity (e.g., identified individual) from response method table 118. Situational context program 200 provides a response to the user of computing device 110 that corresponds with the identity detected within proximity. In the depicted embodiment, situational context program 200 resides on computing device 110. In another embodiment, situational context program 200 may be located on another computing device or server (not shown) and connected over network 130, provided situational context program 200 is able to access application software 114, response method table 118, and recognition information 119.

Figure 2:
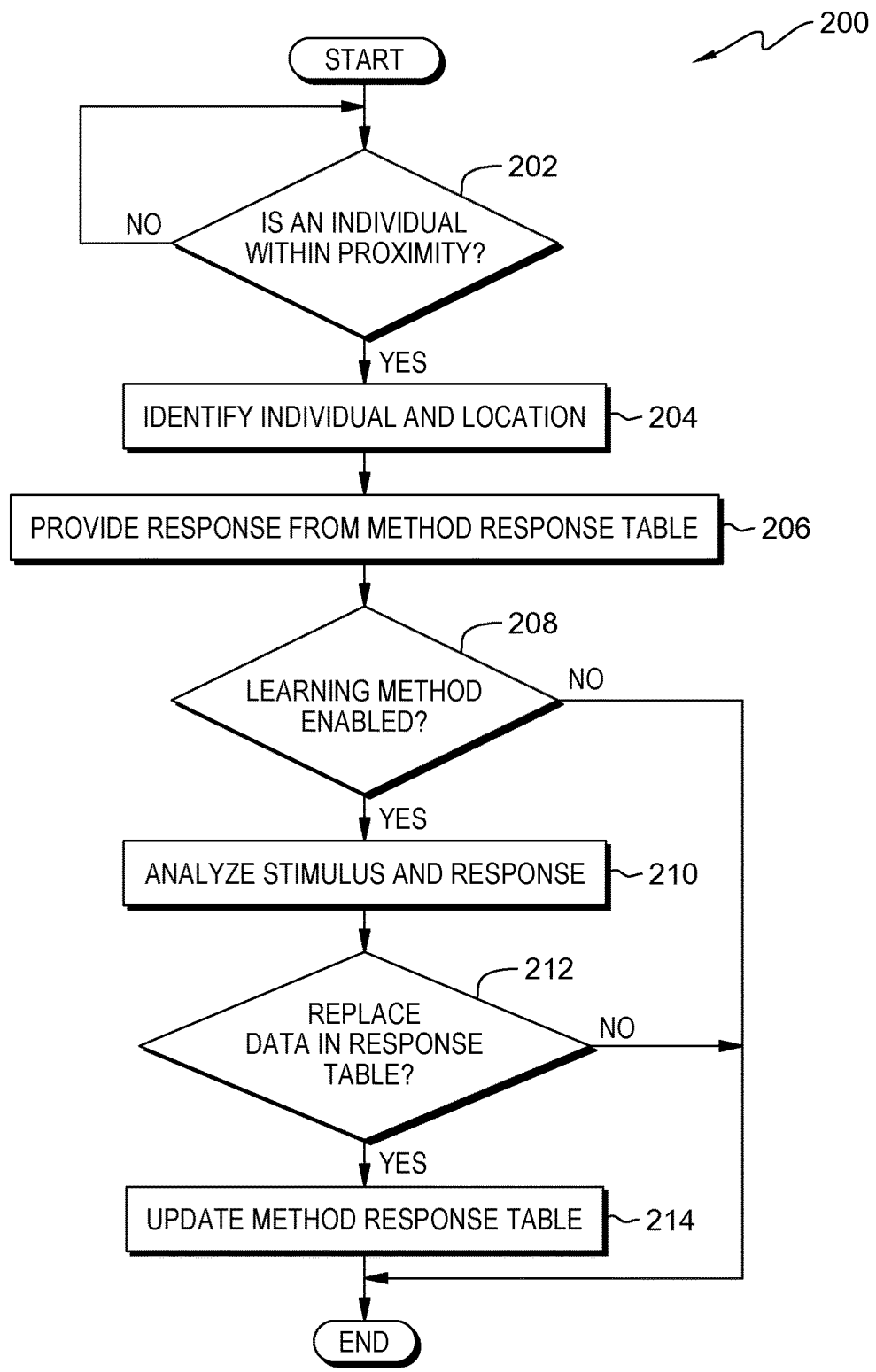
FIG. 2 is a flowchart depicting operational steps of an situational context program, on a computing device within the situational awareness environment of FIG. 1, for combining contextual information with situational awareness information in order to determine and initiate a corresponding response on the computing device, in accordance with an embodiment of the present invention.

FIG. 2 is a flowchart depicting operational steps of situational context program 200, a program for combining contextual information with situational awareness information in order to determine and initiate a corresponding response on computing device 110, in accordance with an embodiment of the present invention.

Prior to initiating, the user of computing device 110 defines preferences within situational context program 200 and information that creates an initial instance of response method table 118. The user defines rendering attributes (e.g., devices, displays, format, language, methods of detection, proximity ranges, sensitivity, duration, revisit time, etc.) for situational context program 200 to utilize and apply to response method table 118. In some embodiments, the user separately defines rendering attributes (e.g., methods of detection, proximity ranges, sensitivity, duration, revisit time, etc.) with respect to the individual entries within response method table 118. In some other embodiment, the user assigns a combination of default settings and separately defined rendering attributes to the entries within response method table 118. For example, when creating an initial instance of response method table 118, the user does not enter rendering attributes for the first entry, and therefore, situational context program 200 utilizes rendering attributes defined in the settings (e.g., default). However, for a second entry within response method table 118, the user defines rendering attributes that replace the initial default settings within the second entry.

Also prior to initiating, the user defines an initial set of individuals (e.g., identities) for which situational context program 200 applies and associated attributes of the individuals with at least a unique priority. In one embodiment, the user enters an identity, priority, location, response method, stimulus, and response through user interface 112 when creating an entry within response method table 118. In another embodiment, the user enters an unspecified identity and/or location (e.g., wild card, "*", etc.), and assigns a unique priority for an entry within response method table 118 (e.g., entry nine of response method table 300). Situational context program 200 assigns the response method to keyword learning for the unspecified identity and location entry and the user enters one or more keywords and a response to complete the entry. In some other embodiment, the user does not define a stimulus and/or response when the response method is set to "historical activity learning" or "keyword learning" and situational context program 200 determines the stimulus and/or response during the operational phase. In one embodiment, the user enters updates to response method table 118 (e.g., user updates existing entries, adds new entries, and/or deletes entries) at any point.

In another embodiment, situational context program 200 updates response method table 118 while operating.

In some embodiments, situational context program 200 initiates after set-up (e.g., completion of initial preferences and creation of an initial instance of response method table 118). In one embodiment, the user opens situational context program 200 on computing device 110, and situational context program 200 initiates. In another embodiment, situational context program 200 initiates upon start-up of computing device 110. Upon initiating, situational context program 200 enters detection mode and monitors the environment for stimulus (e.g., voices, RFID, NFC, PAN connections, etc.). Situational context program 200 monitors situational awareness environment 100 in a listening mode until situational context program 200 receives an indication of a detection (e.g., microphone detects a voice, receives an RFID transmission, etc.). While situational context program 200 initiates additional steps in response to the detection, situational context program 200 continues to monitor situational awareness environment 100 for additional indications of detections.

In decision 202, situational context program 200 determines whether an individual is within proximity of computing device 110. Situational context program 200 receives detection information associated with an individual through peripherals 116. Situational context program 200 identifies the type of detection based on the data and/or peripherals 116 that detected the individual (e.g., microphone detects vocalizations, NFC enabled devices read electronic tags through electromagnetic induction between loop antennae, detection of a new PAN device accessing network 130, etc.). Situational context program 200 accesses predefined settings, as entered during set-up associated with the type of detection and compares one or more characteristics associated with the detection with predefined settings and thresholds in order to determine whether the individual is within proximity of computing device 110.

In one embodiment, situational context program 200 compares the strength of the received detection with the threshold strength level within the predefined settings to determine proximity. The threshold strength level of the detection is based upon the type of detection. In one embodiment, situational context program 200 utilizes a threshold strength level that refers to a signal strength which is the measurement of the magnitude of the electric field at a reference point at a distance from the transmitting antenna or received signal strength indicator (e.g., power present in a received radio signal). For example, the threshold signal strength is set within preferences that indicates the signal strength is equal to and/or greater than fifty percent, which relates to a distance of between five and ten meters when the signal strength is equal to fifty percent, (the distance is less when the signal strength is greater than fifty percent) from computing device 110. In another embodiment, situational context program 200 utilizes a threshold strength that refers to a decibel (dB) level, which measures the intensity and power of a sound (e.g., voice) at a receiver. For example, within the preferences, the threshold strength level for a voice detection is equal to and/or greater than 30 dB (e.g., decibel level of a whisper), which relates a distance of approximately 6 feet away (or less when the decibel level is higher) from computing device 110. Situational context program 200 compares the received strength associated with the detection with the threshold strength. Situational context program 200 determines the individual is in proximity when the received strength associated with the detection is equal to or greater than the threshold strength.

In another embodiment, situational context program 200 compares the duration of the detection with a duration threshold to determine proximity. The duration threshold refers to the minimum amount of time over which situational context program 200 receives the detection information and determines the detection is within proximity and/or valid (e.g., thirty seconds, one minute, etc.). In one embodiment, situational context program 200 utilizes a duration threshold that is universal across of the types of detection. In another embodiment, situational context program 200 utilizes a duration threshold that is associated with specific detection types. For example, the duration threshold for voices may be less than the duration threshold associated with computing devices that establish connections to network 130. Situational context program 200 determines the duration (i.e., length of time) associated with the received detection, calculating the time between the first detection and the last detection (e.g. latest detection) that are equal to and/or greater than the strength threshold. In one embodiment, situational context program 200 measures the duration of the detection as a continuous connection. For example, a smart phone that connects to network 130, establishes a continuous connection in which situational context program 200 measures the duration as the time from the establishment of a connection to the loss of the connection (e.g., when the device is no longer in range of network 130 and/or the user disconnects from network 130). In another embodiment, situational context program 200 determines a duration associated with a detection as a series of detections (e.g., same individual, same device). For example, when a person engages in a conversation, lapses occur when a second person speaks. Situational context program 200 tracks the multiple detections and with voice recognition software distinguishes the individual speakers in the conversation. Situational context program 200 calculates the time between detections of the same voice using the time associated with the start of the detection and the time associated with the end of the last detection. Situational context program 200 compares the calculated duration with the threshold duration. Situational context program 200 determines the individual is in proximity when the calculated duration meets and/or exceeds the threshold duration.

In some other embodiment, situational context program 200 determines whether the individual is in proximity of computing device 110 based on the comparison of the strength threshold and the comparison of the duration threshold with the determined strength level and the determined duration associated with the detection. In one embodiment, situational context program 200 determines the individual is in proximity of computing device 110 when the strength level of the detection remains equal to and/or greater than the strength level threshold over the duration of the detection which also meets and/or exceeds the duration threshold. For example, the detection remains at a strength of fifty percent of greater over a one minute period. Situational context program 200 determines both conditions are met, and therefore the individual is within proximity of computing device 110. Conversely, in another embodiment, situational context program 200 determines the determined strength level does not meet and/or exceed the strength threshold and/or the determined duration does not meet and/or exceed the duration threshold, (i.e., one or more conditions are not met) and situational context program 200 determines the individual is not in proximity of computing device 110.

In yet another embodiment, situational context program 200 analyzes the strength levels of the detection over the calculated duration and determines whether the individual is in proximity of computing device 110. For example, the signal strength of the detection may start at seventy percent, but over the calculated duration, the signal strength decreases to fifty-five percent. Situational context program 200 determines the individual associated with the detection is moving away from computing device 110 and is not in proximity. Conversely, as the signal strength increases over the duration, situational context program 200 determines the individual associated with the detection is moving towards computing device 110 and is in proximity.

In yet some other embodiment, situational context program 200 determines whether the individual is in proximity of computing device 110 based on a directional component associated with the detection. For example, computing device 110 is a smart phone. The position and direction (e.g., orientation) of the smart phone is discernable based upon the gyroscope. As situational context program 200 receives the detection information through peripherals 116, situational context program 200 applies the information from the gyroscope of computing device 110 to the detection information. Situational context program 200 identifies a direction associated with the individual associated with the detection that translates to an angle in which computing device 110 serves as the origin. Situational context program 200 compares the direction of the signal with a forward viewing angle (e.g., plus or minus 30 degrees, equating to a 60 degree forward viewing angle), which indicates the individual is in front of the user associated with computing device 110. Situational context program 200 determines the individual is in proximity when the detection is within the predefined forward viewing angle (e.g., in front of the user). Situational context program 200 determines the individual is not in proximity when the detection is outside the predefined forward viewing angle (e.g., behind the user at 270 degrees, to the side of the user at 180 degrees, etc.)

Situational context program 200 may determine whether the individual is in proximity of computing device 110 based on one or more of the aforementioned embodiments. If situational context program 200 determines the individual is within proximity of computing device 110 (decision 202, yes branch), then situational context program 200 identifies the individual and a location (step 204). If situational context program 200 determines an individual is not within proximity of computing device 110 (decision 202, no branch) then situational context program 200 determines whether an individual is within proximity of computing device 110 (decision 202).

In step 204, situational context program 200 identifies the individual and a location. In one embodiment, situational context program 200 compares the detection information with recognition information 119. For example, situational context program 200 utilizes voice recognition software that compares voice characteristics from the detection with the voice characteristics in recognition information 119 and determines an identity. In another example, situational context program 200 retrieves and compares a media access control address (MAC address) of a network interface associated with the detection with the MAC addresses stored within recognition information 119 and determines an identity. In other embodiments, situational context program 200 utilizes methods known by one skilled in the art for the purpose of determining an identity.

Situational context program 200 identifies a location associated with computing device 110. In one embodiment, situational context program 200 receives a fixed location (e.g., stationary). For example the user sets the location of computing device 110 to a fixed geographic location such as an office within a building where the user sits each day. In another embodiment, situational context program 200 receives a mobile location and situational context program 200 determines a location based on methods known by one skilled in the art (e.g., global positioning system (GPS) coordinates, triangulation, etc.). In another embodiment, situational context program 200 determines a location based on connection established between computing device 110 and network 130. For example, computing device 110 is a smart phone that connects to a vehicle that includes a personal area network (PAN). Situational context program 200 determines computing device 110 pairs with the vehicle and determines computing device 110 is located in a vehicle (e.g., car, truck sport utility vehicle, etc.). In some other embodiment, situational context program 200 identifies a location associated with an internet protocol (IP) address. In yet another embodiment, situational context program 200 utilizes a geo-fence to define a location (e.g., fixed or mobile). The geo-fence is a virtual perimeter for an actual geographic area. For example, a home is not a single geographic point but includes an area that encompasses the property associated with the home in addition to the home. In the instance of a work location, the work location is not solely the office in which an individual works, but can extend to the offices and property owned by the business such as the headquarters of a corporation. Within the preferences and settings, the user defines a geo-fence (e.g., radius) associated with the locations. Situational context program 200 identifies a geographic location, and compares the geographic location with exact geographic locations and/or geographic locations associated with areas created by geo-fences. Situational context program 200 assigns the associated location (e.g., "home", "work", "car", etc.) to the geographic locations that are included within the geo-fence. In other embodiments, situational context program 200 utilizes additional methods known by one skilled in the art to determine a location.

In step 206, situational context program 200 provides a response from response method table 118. In one embodiment, situational context program 200 identifies a single entry within response method table 118 based on the identity and location. For example, the user associated with computing device 110 is watching a newscast on computing device 110 when an individual approaches and addresses the user. Situational context program 200 determines and individual is within proximity, the identity of the individual is "client" and the location is "any" in decision 202 and step 204. Situational context program 200 accesses response method table 300 and identifies entry eight associated with the identity of "client" and location of "any" for further processing.

In another embodiment, situational context program 200 identifies more than a single entry within response method table 118. For example, a spouse and a child are conversing and enter an area where the user of computing device 110 is watching a newscast. Situational context program 200 identifies two voices, and utilizes voice recognition software to identify the individual associated with a first voice and an individual associated with a second voice. Situational context program 200 identifies the first voice as "spouse" and the second voice as "child" based on the information within recognition information 119. Situational context program 200 determines the first voice and second voice are within proximity based on meeting the strength threshold and the duration threshold. Situational context program 200 determines the location is home based on predefined settings associated with network connections (e.g., computing device 110 connects to an instance of network 130 identified as a home network of the user). As more than one entry number within response method table 300 is possible for selection, (e.g., either entry number one or entry number three), situational context program 200 compares the priority associated with entry number one to the priority associated with entry number three (e.g., lower number is higher priority). Situational context program 200 determines the priority associated with entry number one (e.g., 7) is higher than the priority of entry number three (e.g., 8), and therefore, situational context program 200 selects entry number one for further processing.

Situational context program 200 determines whether the stimulus associated with the identified entry number occurs. In some embodiments, within the preferences, the user sets a timeout and/or a tolerance. The tolerance refers to a specified number of actions that the user is allowed to perform prior to performing the stimulus (stimulus can occur at any point prior to the maximum number) prior to initiating an error protocol. The timeout refers to the amount of time situational context program 200 waits to receive the stimulus (e.g., keyword, user action) prior to initiating an error protocol. The error protocol defines additional steps and/or further actions situational context program 200 initiates in the event the stimulus does not occur or not met. Situational context program 200 utilizes the preferences associated with tolerances and/or timeouts in order to assist in determining whether the stimulus occurs. Situational context program 200 utilizes the preferences to provide boundaries that define an acceptable time period and/or tolerance to wait for a stimulus to occur within, prior to situational context program 200 continuing.

In one embodiment, situational context program 200 retrieves a stimulus associated with the identified entry number of a proximity (e.g., static response, historical activity learning) from response method table 118. For example, situational context program 200 identifies entry number one (e.g., "spouse"+"home", with priority over "child") within response method table 300. Situational context program 200 retrieves the stimulus for entry number one from response method table 300, which is proximity. Situational context program 200 determines the stimulus of proximity is met (as determined in decision 202), and situational context program 200 initiates the response associated with entry number one to "suspend application". Situational context program 200 sends a command to application software 114 (e.g., media player) on computing device 110, through which the user is viewing the newscast, and pauses the newscast.

In another embodiment, retrieves a stimulus associated with the identified entry number of a keyword or keywords (e.g., keyword learning, historical learning activity) from response method table 118. Situational context program 200 begins a timer to measure an elapsed time. Situational context program 200 determines whether the elapsed time meets and/or exceeds the timeout. While the elapsed time does not meet and/or exceed the time, situational context program 200 analyzes the voice data (e.g., previous and ongoing) associated with the identified individual and keyword (more than one keyword may be defined within the stimulus). In one embodiment, situational context program 200 determines the individual speaks the keyword, and situational context program 200 initiates the response within the identified entry number. For example situational context program 200 identifies entry number five within response method table 300 for "co-worker"+"car". Situational context program 200 receives incoming voice data associated with the co-worker in which the coworker asks "Did you catch the score for the game last night?" Situational context program 200 analyzes the voice data and identifies the keyword "score". Situational context program 200 determines the stimulus criteria is met (e.g., co-worker spoke the keyword "score"), and situational context program 200 tunes computing device 110 to a sports radio station or an alternate audio broadcast.

In another embodiment, situational context program 200 retrieves a stimulus associated with the identified entry number that includes a user action (e.g., historical activity learning). Situational context program 200 determines whether the elapsed time meets and/or exceeds the timeout and/or whether the tolerance is met and/or exceeded. While the elapsed time does not meet and/or exceed the time and/or the tolerance is not met and/or exceeded, situational context program 200 receives and analyzes actions the user initiates on computing device 110 via user interface 112. Situational context program 200 determines whether the user initiated actions match the stimulus. In one embodiment, situational context program determines the user initiated action matches the stimulus and situational context program 200 initiates the response. For example the first action the user initiates corresponds to the stimulus action and situational context program 200 initiates the response. In another embodiment, situational context program 200 determines the user initiated action matches the stimulus within a tolerance and situational context program 200 initiates the response. For example a tolerance is set to a maximum of five actions. The user is working on a client presentation when a co-worker enters within a proximity of computing device 110. The user first saves the presentation, minimizes the presentation, and then selects the e-mail client, which is the stimulus action. Situational context program 200 determines the stimulus action occurred prior to the exceeding the tolerance, and situational context program 200 opens the latest e-mail from the co-worker.

In another embodiment, situational context program 200 determines the stimulus criteria is not met (e.g., identity does not speak a keyword, user does not perform stimulus action, etc.). Situational context program 200 determines whether the elapsed time meets and/or exceeds the timeout and/or user actions meet and/or exceed the tolerance. In one embodiment, situational context program 200 determines the elapsed time does not meet and/or exceed the timeout setting and determines the number of user actions do not meet and/or exceed the tolerance, and situational context program 200 continues to analyze the data for the stimulus (e.g., keyword, user action). In another embodiment, situational context program 200 determines the elapsed time meets and/or exceeds the timeout setting and/or the number of user actions meet and/or exceed the tolerance, and implements an error protocol. In one embodiment, situational context program 200 initiates an error protocol that automatically initiates the response without receiving the keyword and or user action. In another embodiment situational context program 200 initiates an error protocol that provides a selectable option for the user to initiate the response. In some other embodiment, situational context program 200 initiates an error protocol in which situational context program 200 determines whether a learning method is enabled (decision 208). In yet another embodiment, situational context program 200 performs one or more of the aforementioned error protocols.

In an alternate embodiment, while the stimulus is not met and the timeout and/or tolerance are not met and/or exceeded, situational context program 200 determines, a second individual is within proximity (decision 202, yes branch) and determines the identity and location of the second individual (step 204). Situational context program 200 identifies more than a single entry number within response method table 118 (e.g., first identity and second identity). Situational context program 200 compares the priority of the second identity with the priority of the first identity (step 206). In one embodiment situational context program 200 determines the priority of the second identity is higher than the priority of the first identity. Situational context program 200 selects the second identity and provides the response from response method table 118 with the second identity (e.g., replaces the first identity with the second identity).

For example, situational context program 200 identifies entry number seven within response method table 300 (e.g., identity and location are set to "program manager" and "work" respectively). Situational context program 200 retrieves the response method from entry number seven which is keyword learning and retrieves the stimulus of the word "client". Situational context program 200 determines whether the stimulus, which is a keyword (e.g., "client") is spoken by the program manager. Situational context program 200 analyzes the voice data (e.g., previous and ongoing) associated with the program manager for the word "client". Situational context program 200 determines the program manager does not and/or has not yet spoken the keyword (e.g., "client"). Additionally situational context program 200 determines the elapsed time does not meet and/or exceed the timeout setting. As decision 202 continues to monitor situational awareness environment 100, situational context program 200 determines whether an individual enters proximity of computing device 110. The manager enters the office with the program manager and user (e.g., enters into an ongoing discussion) and situational context program 200 determines a second individual enters the proximity of computing device 110. Situational context program 200 determines the identity of the second individual to be "manager" and the location to be "work". Situational context program 200 compares the priority of the program manager (e.g., three) with the priority of the manager (e.g., two). Situational context program 200 determines "manager" is a higher priority than "program manager" within response method table 300. Situational context program 200 switches to entry number six that is associated with the manager, which includes the response method of static response and the stimulus of proximity. Situational context program 200 determines the stimulus criteria of proximity is met, and initiates application software 114 and program file that displays the most recent status report.

In another embodiment, situational context program 200 determines the priority of the second identity is not higher than the priority of the second identity. Situational context program 200 maintains the selection of the first identity and continues to wait for the stimulus criteria and/or for the elapsed time to meet and/or exceed the timeout setting. For example, instead of the manger entering into the office with the user and program manager, a coworker enters the office. Situational context program 200 performs decision 202 and steps 204-206 as described and situational context program 200 determines the second individual includes an identity of co-worker, location of work, and a priority of four. Situational context program 200 compares the priority of the co-worker (e.g., four) with the priority of the program manager (e.g., three), and determines the program manager is a higher priority than the co-worker. Situational context program 200 does not change the initial selection, and maintains the selection of the entry number associated with the program manager. Situational context program 200 maintains the selection of the program manager and continues to wait for the stimulus criteria of the keyword "client" and/or for the elapsed time to meet and/or exceed the timeout setting.

In another alternate embodiment, situational context program 200 determines the stimulus criteria is not met, and the timeout and tolerance are not met and/or exceeded, and situational context program 200 determines whether an exclusivity tag is set. An exclusivity tag allows more than one entry number to be evaluated in parallel when not set. In one embodiment, situational context program 200 identifies multiple entries for the same identity and location combination (include different priorities) that include different stimulus and/or response methods. In another embodiment, situational context program 200 identifies multiple identities (e.g., multiple entries) with different priorities, and different stimulus and/or response methods. Initially, situational context program 200 selects the higher priority of the two entries, and analyzes received data for the stimulus. However, situational context program 200 determines the stimulus criteria is not, and situational context program 200 determines whether the exclusivity tag is set (e.g., situational context program 200 did not process either entry number).

If situational context program 200 determine the exclusivity tag is not set, then situational context program 200 allows the processing of the second identified entry number in parallel and retrieves the stimulus criteria associated with the second identified entry number. Situational context program 200 determines whether either of the stimulus criteria occur with respect to the first identified enter or the second identified entry number. Situational context program 200 initiates the response associated with the entry number that corresponds to the first received stimulus regardless of priority. Situational context program 200 updates the exclusivity tag associated with the associated entries (i.e., set the exclusivity tag), and situational context program 200 initiates the associated response. If situational context program 200 determines the exclusivity tag is set, then situational context program 200 does not allow processing of an alternate entry number at the same time and evaluates conditions to occur (e.g., timeout, tolerances, new identity, etc.).

For example, a meeting takes place at work, with the user of computing device 110, the program manager, and the co-worker. Based on response method table 300, situational context program 200 determines the program manager is a higher priority (e.g., priority of three) than the co-worker (e.g., priority of four), and therefore, situational context program 200 analyzes the received data (e.g., voice data) for the word "client" associated with the program manager. However, situational context program 200 determines the program manager does not say the word "client" within the first minute of the meeting (e.g., timeout occurs). Situational context program 200 determines the exclusivity tag is not set, and allows for parallel processing of the entry number associated with the coworker. The co-worker tells the user that just prior to the meeting, the coworker sent the user an updated presentation for use at the meeting. The user selects the e-mail client via user interface 112 on computing device 110. Situational context program 200 recognizes the user action as the stimulus associated with the entry number for the co-worker that situational context program 200 processes in parallel. Situational context program 200 retrieves the response from response method table 118, and initiates instructions that open the latest e-mail from the co-worker which includes the presentation. Situational context program 200 updates the exclusivity tag associated with the program manager, and continues to determine whether a learning method is enabled (decision 208).

In the depicted embodiment, situational context program 200 performs step 206 immediately after step 204. In another embodiment, situational context program 200 performs step 206 after step 214. In some other embodiments, situational context program 200 performs step 206 at any point in response to situational context program 200 determining the stimulus associated with the selected entry occurs.

In decision 208, situational context program 200 determines whether a learning method is enabled. Situational context program 200 retrieves the response method associated with the identified entry number from response method table 118. In one embodiment, situational context program 200 retrieves a response method of static, and determines a learning method is not enabled. In another embodiment, situational context program 200 retrieves a response method of keyword learning or historical activity learning, and determines a learning method is enabled.

If situational context program 200 determines a learning method is enabled (decision 208, yes branch), then situational context program 200 analyzes stimulus and responses (step 210). If situational context program 200 determines a learning method is not enable (decision 208, no branch), then situational context program 200 completes.

In step 210, situational context program 200 analyzes stimulus and/or responses, associated with the identified entry, based on the learning method enabled (e.g., keyword learning or historical learning activity.) In one embodiment, situational context program 200 analyses the stimulus associated with the keyword learning method. Situational context program 200 stores the words spoken by the identified individual (e.g., identity associated with the identified entry) for a period of time (e.g., 1 minute, five minutes, a time until a user initiates an action on computing device 110, a time between a first and second user action on computing device 110, etc.). Situational context program 200 removes common words from the stored words utilizing a dictionary that includes commonly used words. Situational context program 200 stores the remaining non-common words. Situational context program 200 stores the number of occurrences associated with each of the remaining non-common words. Situational context program 200 ranks the remaining non-common words by frequency of occurrence. Situational context program 200 assigns the response, which situational context program 200 initiates while storing and analyzing the received data (e.g., voice), to the remaining non-common words.

For example, situational context program 200 identifies and individual in proximity as the program manager (e.g., entry number seven). The program manager says "Hi George. I wanted to stop by for a status about the new program you are developing for our client. The new program is really important to the client. Can you give me more details about the new program? I need to send an overview of the new program and I'd like more details," which situational context program 200 receives through peripherals 116. Situational context program 200 determines the keyword "client" was received, and initiates the response to open the client folder. Situational context program 200 stores the aforementioned words from the received data associated with the program manager. Based on the dictionaries, situational context program 200 removes the words: "Hi," "George," "I"(×2), "wanted," "to"(×2), "stop," "by," "for"(×2), "a," "about," "the"(×5), "you"(×2), "are," "our," "is," "really," "important," "can," "give," "me," "more," "about," "need," "send," "an," "of," "new"(×4), "and," "I'd," "like," and "more". Situational context program 200 stores the remaining words of: "status," "program"(×4), "developing," "client"(×2), "details"(×2), and "overview." Situational context program 200 ranks the remaining non-common words from highest frequency to lowest frequency beginning with program (×4) as the highest and ending with overview as the lowest. In some embodiments, more than one word may be included at a level, for example, client and details both occurred twice, and therefore, share the same ranking or the second highest position. Situational context program 200 assigns the response "open client folder" to each of the ranked non-common words.

In another embodiment situational context program 200 analyses stimulus and response associated with historical activity learning. Situational context program 200 records the stimulus and the response initiated by the user via user interface 112. Situational context program 200 adds the stimulus and the response to historical data that is associated with the identified entry number (i.e., historical data repository that records and stores previous instances of stimulus (e.g., stimuli) and associated responses that are associated with the identity for later evaluation). Situational context program 200 evaluates the historical data and determines the most frequent stimulus and associated response within the historical data (e.g., highest frequency of occurrence stimulus and associated response).

For example, situational context program 200 determines an individual is in proximity, the identity is "child," and the location is "home," and situational context program 200 selects entry number three of response method table 300. Within entry number three of response method table 300, the associated stimulus is "open web browser" and the associated response is "open TV guide". Situational context program 200 receives the actions which the user initiates through user interface 112. Rather than opening the web browser, the user selects application software 114 associated with a media player and once the media player is open selects "play video." Situational context program 200 records the stimulus as the selection of application software 114 associated with the media player and the response as "play video". Situational context program 200 adds an entry to the historical data associated with the child with a stimulus of "open media player" and the response of "play video".

In decision 212, situational context program 200 determines whether to replace data within response method table 118 associated with the identified entry number. In an embodiment in which situational context program 200 retrieves an entry number associated with keyword earning, in one embodiment, situational context program 200 compares the highest ranking non-common word (e.g., highest frequency of occurrence within the non-common words) from the analysis to the frequency of occurrences associated with the keyword within response method table 118. In another embodiment, situational context program 200 compares the highest ranking non-common words from the analysis to the frequency of occurrences associated with the keywords within response method table 118 (i.e., situational context program 200 identifies more than one keyword exists within the identified entry number and compares each word with the frequency of occurrence of the non-common words.) Situational context program 200 determines whether the frequency of occurrence of the highest ranking non-common word is great than, equal to, or less than, the frequency of occurrence associated with the frequency of occurrence associated with the keyword within the identified entry number. If situational context program 200 determines the frequency of occurrence associated with the highest ranked non-common word is greater than the frequency of occurrence associated with the keyword associated with the identified entry number, then situational context program 200 determines to replace data within response method table 118, and situational context program 200 updates response method table 118 (step 214). If situational context program 200 determines the frequency of occurrence associated with the highest ranked non-common word is the same as the frequency of occurrences associated with the keyword associated with the identified entry number, then situational context program 200 determines to replace data within response method table 118, and updates response method table 118 (step 214). If situational context program 200 determines the frequency of occurrences associated with the highest ranked non-common word is less than the frequency of occurrence associated with the keyword associated with the identified entry number, then situational context program 200 determines to not replace data within response method table 118, and situational context program 200 completes.

Continuing the example for keyword learning in which the non-common words are: "status," "program"(×4), "developing," "client"(×2), "details"(×2), and "overview," situational context program 200 determines four instance of "program," two instance of "client," two instances of "details", and one instance of "developing," "overview," and "status" occur. Situational context program 200 determines the frequency of occurrence associated with "program" (e.g., four instances) is greater than the frequency of occurrence associated with the keyword of "client" (e.g., two instances). Situational context program 200 determines to update the data within response method table 300 associated with the identified entry number. Situational context program 200 updates response method table 300 (step 214).

In an alternate embodiment, situational context program 200 determines more than one non-common word is associated with the same frequency of occurrence. For example, the frequency of occurrence associated with "client" and "details" are two. If "program" was not included, "client" and "details" would share the highest ranking for frequency of occurrence. In one embodiment, situational context program 200 maintains the current keyword of "client" and adds the second non-common word of "details" as a second keyword within response method table 300. In another embodiment, situational context program 200 provides the non-common words that share the highest frequency of occurrence to the user for selection. In another embodiment, situational context program 200 compares the current keyword with the highest frequency of occurrence. If situational context program 200 determines a match, situational context program 200 maintains the matching keyword. If situational context program 200 does not determine a match, situational context program 200 may utilize the aforementioned embodiments to determine whether to update response method table 118.

In another embodiment, in which situational context program 200 retrieves an identified entry number associated with historical activity learning, situational context program 200 determines the frequency of occurrence associated with each unique combination of the stimulus and the response within the historical data. Situational context program 200 selects the stimulus and response combination associated with the highest frequency of occurrence to be associated with the identified entry number. Situational context program 200 compares the selected stimulus and response combination with the stimulus and response within response method table 118. In one embodiment, situational context program 200 determines the selected stimulus and response combination does not match the stimulus and response within response method table 118, and situational context program 200 determines to replace data within response method table 118, and situational context program 200 updates response method table 118 (step 214). In another embodiment, situational context program 200 determines the selected stimulus and response combination matches the stimulus and response within response method table 118, and situational context program 200 determines not to replace data within response method table 118 and situational context program 200 ends.

In an alternate embodiment, situational context program 200 determines more than one stimulus and response combination share the same frequency of occurrence. For example, two stimulus and response combinations have a frequency of occurrence of two. In one embodiment, situational context program 200 maintains the stimulus and response associated with the existing entry number (i.e., does not provide an update). In another embodiment, situational context program 200 provides the stimulus and response for the two stimulus and response combinations to the user for selection to either update response method table 118 or maintain the existing data of the entry. In another embodiment, situational context program 200 selects the most recently occurring stimulus and response combination of the multiple instances. For example, the first stimulus and response combination took place a week ago and the second stimulus response combination took place yesterday and today. Situational context program 200 determines the second stimulus and response combination that took place today is the most recent, and situational context program 200 determines to replace the data within response method table 118. In another embodiment, situational context program 200 compares each of the stimulus and response combinations to current stimulus and response within response method table 118. If situational context program 200 determines a match, situational context program 200 maintains the matching combination and situational context program 200 determines to not replace the data. If situational context program 200 does not determine a match, situational context program 200 may utilize one or more of the aforementioned embodiments to determine whether to replace the data within response method table 118.

For example, the historical data associated with the identified entry number associated with "child" includes five previous data entries and the new current data entry. The first data entry includes a stimulus of "open web browser" and an associated response of "open TV guide." The second data entry includes a stimulus of "open web browser" and an associated response of "open application store." The third data entry includes a stimulus of "open media player" with an associated response of "play video." The fourth data entry includes a stimulus of "open web browser" and an associated response of "open television (TV) guide." The fifth data entry includes a stimulus of "open web browser" and an associated response of "open TV guide." The sixth data entry (e.g., current entry) includes a stimulus of "open media player" with an associated response of "play video." Situational context program 200 determines three instances include a stimulus of "open web browser" and an associated response of "open TV guide," two instances include a stimulus of "open media player" with an associated response of "play video," and one instance includes "open web browser" and an associated response of "open application store." Situational context program 200 determines the most frequent stimulus and response is the combination of the stimulus of "open web browser" and an associated response of "open TV guide." Situational context program 200 compares the most (e.g., highest) frequent stimulus and response within historical data with the current stimulus and response within response method table 300 (e.g., response method table 118). Situational context program 200 determines the stimulus and response of the current identified entry number matches the most frequent stimulus and response within the historical data, and situational context program 200 determines to not replace the data within response method table 300, and situational context program 200 ends.

If situational context program 200 determines to replace data within response method table 118 (decision 212, yes branch), then situational context program 200 updates response method table 118 (step 214). If situational context program 200 determines not to replace data within response method table 118 (decision 212, no branch), then situational context program 200 ends.

In step 214, situational context program 200 updates response method table 118. In one embodiment, situational context program 200 updates the stimulus associated with the identified entry number within response method table 118 for keyword learning. Situational context program 200 replaces the existing keyword or keywords within the identified entry number with the highest frequency of occurrence non-common keyword or keywords. For example, the word "program" occurred more frequently than the word "client" within identified entry number seven associated with the program manager. Situational context program 200 replaces the stimulus of "client" with the keyword of "program" within response method table 350. Situational context program 200 ends after updating response method table 118.

In another embodiment, situational context program 200 updates the stimulus and/or response associated with the identified entry number within response method table 118 for historical activity learning. For example, situational context program 200 records two additional instances that include a stimulus of "open media player" with an associated response of "play video" within the historical data associated with the identified entry number associated with "child" (e.g., entry number three). Situational context program 200 determines four instances of the stimulus and response combination of "open media player" and "play video" and determines the frequency of occurrence is greater than the existing frequency of occurrence associated with the stimulus and response combination of "open web browser" and "open TV guide." Situational context program 200 updates the identified entry number associated with "child" (e.g., entry number three) within response method table 350 to include a stimulus of "open media player" and a response of "play video." Situational context program 200 completes after updating response method table 118.

FIG. 3A depicts response method table 300, an example of response method table 118 as initially entered by a user of computing device 110 via user interface 112. Response method table 300 includes entry numbers 1-9, in which each entry number includes an identity, location, priority, response method, stimulus and response. Entry number one includes: an identity of "spouse", a location of "home", a priority of "seven", a response method of "static response", a stimulus of "proximity", and a response of "suspend application." Entry number two includes: an identity of "spouse", a location of "car", a priority of "six", a response method of "historical activity learning", a stimulus of "turn off radio", and a response of "open nearby attraction application." Entry number three includes: an identity of "child", a location of "home", a priority of "eight", a response method of "historical activity learning", a stimulus of "opens web browser", and a response of "open TV guide." Entry number four includes: an identity of "coworker", a location of "work", a priority of "four", a response method of "historical activity learning", a stimulus of "selects e-mail client", and a response of "open e-mails from coworker." Entry number five includes: an identity of "coworker", a location of "car", a priority of "five", a response method of "keyword learning," a stimulus of "hockey," "score," or "team," and a response of "selects sports radio station." Entry number six includes: an identity of "manager", a location of "work", a priority of "two", a response method of "static response", a stimulus of "proximity", and a response of "open most recent status report." Entry number seven includes: an identity of "program manager", a location of "work", a priority of "three", a response method of "keyword learning", a stimulus of "client", and a response of "open client folder." Entry number eight includes: an identity of "client", a location of "any", a priority of "one", a response method of "static response", a stimulus of "proximity", and a response of "open client progress file." Entry number nine includes: an identity of "*", a location of "*", a priority of "nine", a response method of "keyword learning", a stimulus of "restaurant," "lunch," or "dinner," and a response of "open restaurant finer application."

FIG. 3B depicts response method table 350, an example of response method table 118 in which situational context program 200 updates the initial entries of response method table 300 with respect to entry number three and entry number seven after performing an analysis via historical activity learning and keyword learning respectively. Response method table 300 includes entry numbers 1-9, in which each entry number includes an identity, location, priority, response method, stimulus and response. Entry number one includes: an identity of "spouse", a location of "home", a priority of "seven", a response method of "static response", a stimulus of "proximity", and a response of "suspend application." Entry number two includes: an identity of "spouse", a location of "car", a priority of "six", a response method of "historical activity learning", a stimulus of "turn off radio", and a response of "open nearby attraction application." Entry number three includes: an identity of "child", a location of "home", a priority of "eight", a response method of "historical activity learning", a stimulus of "opens media player", and a response of "play video." Entry number four includes: an identity of "coworker", a location of "work", a priority of "four", a response method of "historical activity learning", a stimulus of "selects e-mail client", and a response of "open e-mails from coworker." Entry number five includes: an identity of "coworker", a location of "car", a priority of "five", a response method of "keyword learning," a stimulus of "hockey," "score," or "team," and a response of "selects sports radio station." Entry number six includes: an identity of "manager", a location of "work", a priority of "two", a response method of "static response", a stimulus of "proximity", and a response of "open most recent status report." Entry number seven includes: an identity of "program manager", a location of "work", a priority of "three", a response method of "keyword learning", a stimulus of "program", and a response of "open client folder." Entry number eight includes; an identity of "client", a location of "any", a priority of "one", a response method of "static response", a stimulus of "proximity", and a response of "open client progress file." Entry number nine includes: an identity of "*", a location of "*", a priority of "nine", a response method of "keyword learning", a stimulus of "restaurant," "lunch," or "dinner," and a response of "open restaurant finer application."

Figure 4:
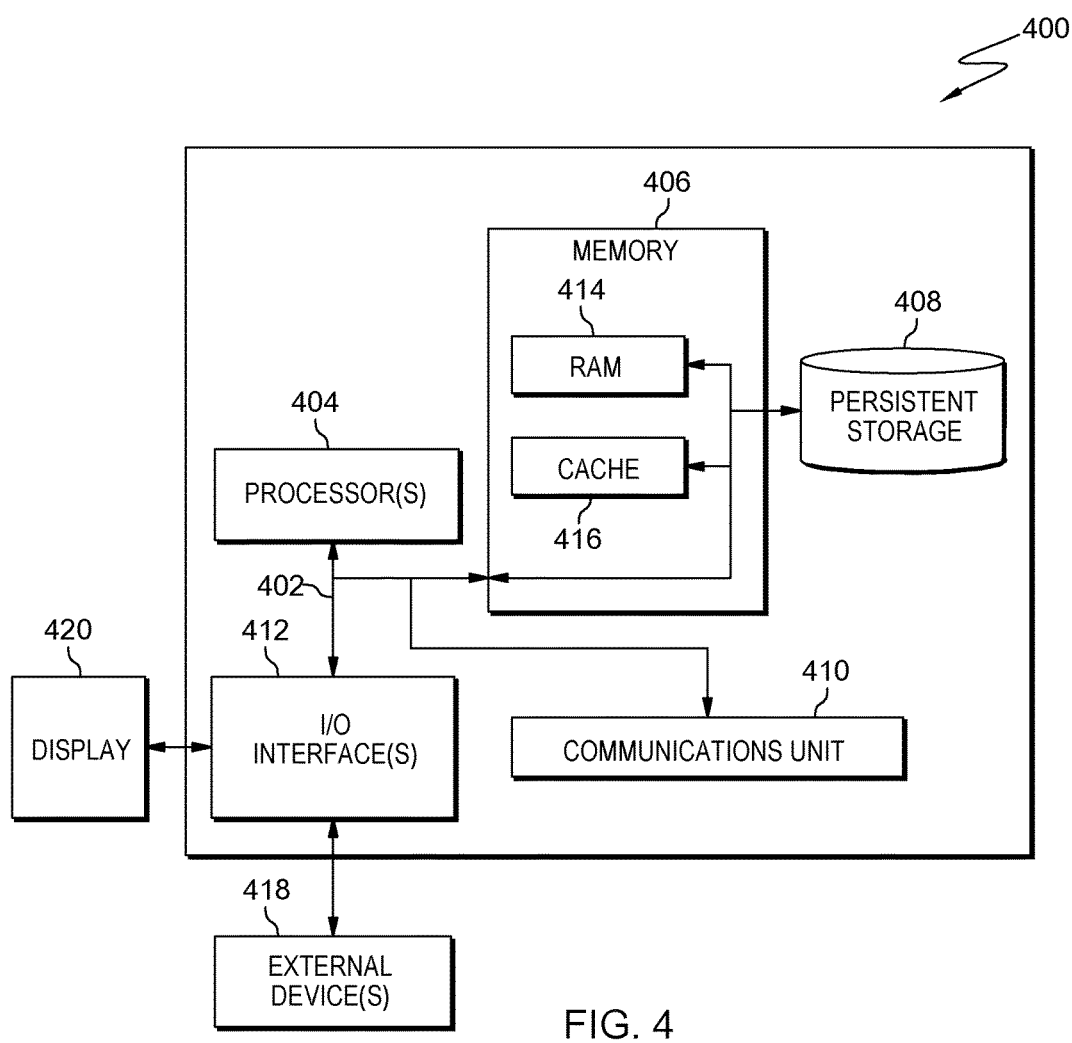
FIG. 4 is a block diagram of components of the computing device executing the situational context program, in accordance with an embodiment of the present invention.

FIG. 4 depicts a block diagram of components of computing device 400 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 400 includes communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM) 414. In general, memory 406 can include any suitable volatile or non-volatile computer readable storage media. Cache 416 is a fast memory that enhances the performance of computer processor(s) 404 by holding recently accessed data, and data near accessed data, from memory 406.

User interface 112, application software 114, peripherals 116, response method table 118, recognition information 119, and situational context program 200 may be stored in persistent storage 408 and in memory 406 for execution and/or access by one or more of the respective computer processor(s) 404 via cache 416. In an embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. User interface 112, application software 114, peripherals 116, response method table 118, recognition information 119, and situational context program 200 may be downloaded to persistent storage 408 through communications unit 410.

I/O interface(s) 412 allows for input and output of data with other devices that may be connected to computing device 400. For example, I/O interface(s) 412 may provide a connection to external device(s) 418, such as a keyboard, a keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., user interface 112, application software 114, peripherals 116, response method table 118, recognition information 119, and situational context program 200, can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for providing a response based on situational context, the method comprising:
    determining, by one or more computer processors, that an individual is within a proximity of a computing device;
    identifying, by one or more computer processors, an identity associated with the determined individual within the proximity of the computing device;
    determining, by one or more computer processors, a location associated with the identified identity;
    identifying, by one or more computer processors, an entry within a table based, at least in part, on the identified identity, the determined location, and input data associated with the identified identity;
    generating, by one or more computer processors, a suggested response based on an identified input data associated with the identified entry within the table;
    determining, by one or more computer processors, a frequency of occurrence associated with the suggested response, wherein the suggested response is an identified keyword;
    in response to determining the frequency of occurrence associated with the suggested response, updating, by one or more computer processors, the suggested response within the identified entry;
    in response to updating the suggested response, by one or more computer processors, displaying recognition information and the suggested response when the identified identity enters the determined location on at least one digital device associated with another individual; and
    navigating the another individual by using an adaptive machine learning algorithm, wherein the adaptive machine learning algorithm analyzes the input data associated with the identified identity and the determined location of the identified identity.

2. The method of claim 1, wherein determining that the individual is within the proximity of the computing device further comprises:
    determining, by one or more computer processors, a physical orientation associated with the computing device;
    receiving, by one or more computer processors, data associated with the individual via a peripheral associated with the computing device;
    identifying, by one or more computer processors, a directional component associated with the received data with respect to the determined physical orientation associated with the computing device, wherein the directional component translates to an angle with respect to the determined physical orientation of the computing device;
    determining, by one or more computer processors, whether the identified directional component associated with the received data is greater than a predefined forward viewing angle; and
    responsive to determining the identified directional component associated with the received data is not greater than the predefined forward viewing angle, determining, by one or more compute processors, the individual is within proximity of the computing device.

3. The method of claim 1, further comprising:
    retrieving, by one or more computer processor, a response method associated with the identified entry; wherein the response method includes one of the following: a static method, a keyword learning method, and a historical activity learning method; and
    determining, by one or more computer processors, whether to update the identified entry based on the retrieved response method.

4. The method of claim 3, wherein determining whether to update the identified entry based on the retrieved response method further comprises:
    determining, by one or more processors, the retrieved response method is the keyword learning method;
    recording, by one or more computer processors, voice data associated with the identified identity;
    identifying, by one or more computer processors, one or more non-common words within the recorded voice data based on a dictionary that identifies common words;
    calculating, by one or more computer processors, a frequency of occurrence associated with each one of the one or more non-common words;
    ranking, by one or more computer processors, the identified one or more non-common words based on the calculated frequency of occurrence associated with each one of the one or more non-common words;
    identifying, by one or more computer processors, a highest ranked non-common word within the ranked identified one or more non-common words;
    retrieving, by one or more computer processors, the keyword from the identified entry;
    identifying, by one or more computer processors, the retrieved keyword within the one or more non-common words;
    determining, by one or more computer processors, whether the frequency of occurrence associated with the identified keyword within the one or more non-common words is less than the frequency of occurrence of the identified highest ranked non-common word; and
    responsive to determining the frequency of occurrence associated with the identified keyword within the one or more non-common words is less than the frequency of occurrence of the identified highest ranked non-common word, updating, by one or more computer processors, the identified keyword within the identified entry with the identified highest ranked non-common word.

5. The method of claim 3, wherein determining whether to update the identified entry based on the retrieved response method further comprises:
  determining, by one or more processors, the retrieved response method is the historical activity learning method;
  determining, by one or more computer processors, a stimulus and an associated response occur;
  adding, by one or more computer processors, the determined stimulus and the associated response to a historical data repository that includes one or more previous instances of determined stimuli and associated responses;
  calculating, by one or more computer processors, a frequency of occurrence associated with one or more individual instances of the one or more previous instances of determined stimuli and the associated responses within the historical data repository;
  ranking, by one or more computer processors, the calculated frequency of occurrence of the one or more individual instances of the one or more previous instances of determined stimuli and the associated responses within the historical data repository;
  selecting, by one or more computer processors, a highest ranked frequency of occurrence stimulus and associated response based on the ranked calculated frequency of occurrence;
  retrieving, by one or more computer processors, a stimulus and a response associated with the identified entry;
  determining, by one or more computer processors, whether the retrieved stimulus and retrieved response associated with the identified entry do not match the selected highest ranked frequency of occurrence stimulus and the associated response; and
  responsive to determining the retrieved stimulus and retrieved response associated with the identified entry do not match the selected highest ranked frequency of occurrence stimulus and the associated response, updating, by one or more computer processors, the retrieved stimulus and the retrieved response associated with the identified entry with the selected highest ranked frequency of occurrence stimulus and the associated response.

6. The method of claim 1, wherein identifying a stimulus associated with the identified identity further comprises:
  retrieving, by one or more computer processors, the input data associated with the identified identity;
  receiving, by one or more computer processors, data wherein the data includes one of the following: a proximity, a voice data associated with the identified individual, and an action from a user associated with the computing device; and
  determining, by one or more computer processors, a match occurs within the received data and the retrieved stimulus based on a comparison of the received data to the retrieved stimulus.

7. The method of claim 1 wherein the determined location includes a geo-fence.

8. A computer program product for providing a response based on situational context, the computer program product comprising:
  one or more computer readable storage media and program instructions stored on the one or more computer readable storage media, the program instructions comprising:
  program instructions to determine, by one or more computer processors, that an individual is within a proximity of a computing device;
  program instructions to identify, by one or more computer processors, an identity associated with the determined individual within the proximity of the computing device;
  program instructions to determine, by one or more computer processors, a location associated with the identified identity;
  program instructions to identify, by one or more computer processors, an entry within a table based, at least in part, on the identified identity, the determined location, and input data associated with the identified identity, wherein program instructions to identify the input data comprise program instructions to measure displacement of an object within an electric field;
  program instructions to generate, by one or more computer processors, a suggested response based on the identified input data associated with the identified identity;
  program instructions to determine, by one or more computer processors, a frequency of occurrence associated with the suggested response, wherein the suggested response is an identified keyword;
  in response to determining the frequency of occurrence associated with the suggested response, program instructions to update, by one or more computer processors, the suggested response within the identified entry;
  in response to program instructions to generate the suggested response, by one or more computer processors, displaying recognition information and the suggested response when the identified identity enters the determined location on at least one digital device associated with another individual; and
  program instructions to navigate the another individual using an adaptive machine learning algorithm, wherein the adaptive machine learning algorithm analyzes the input data associated with the identified identity and the determined location of the identified identity.

9. The computer program product of claim 8, wherein to determine that the individual is within the proximity of the computing device further comprises one or more of the following program instructions, stored on the one or more computer readable storage media, to:
  determine a physical orientation associated with the computing device;
  receive data associated with the individual via a peripheral associated with the computing device;
  identify a directional component associated with the received data with respect to the determined physical orientation associated with the computing device, wherein the directional component translates to an angle with respect to the determined physical orientation of the computing device;
  determine whether the identified directional component associated with the received data is greater than a predefined forward viewing angle; and
  responsive to determining the identified directional component associated with the received data is not greater than the predefined forward viewing angle, determine the individual is within proximity of the computing device.

10. The computer program product of claim 8, further comprising one or more of the following program instructions, stored on the one or more computer readable storage media, to:
retrieve a response method associated with the identified entry; wherein the response method includes one of the following: a static method, a keyword learning method, and a historical activity learning method; and
determine whether to update the identified entry based on the retrieved response method.

11. The computer program product of claim 10, wherein to determine whether to update the identified entry based on the retrieved response method further comprises one or more of the following program instructions, stored on the one or more computer readable storage media, to:
determine the retrieved response method is the keyword learning method;
record voice data associated with the identified identity;
identify one or more non-common words within the recorded voice data based on a dictionary that identifies common words;
calculate a frequency of occurrence associated with each one of the one or more non-common words;
rank the identified one or more non-common words based on the calculated frequency of occurrence associated with each one of the one or more non-common words;
identify a highest ranked non-common word within the ranked identified one or more non-common words;
retrieve the keyword from the identified entry;
identify the retrieved keyword within the one or more non-common words;
determine whether the frequency of occurrence associated with the identified keyword within the one or more non-common words is less than the frequency of occurrence of the identified highest ranked non-common word; and
responsive to determining the frequency of occurrence associated with the identified keyword within the one or more non-common words is less than the frequency of occurrence of the identified highest ranked non-common word, update the identified keyword within the identified entry with the identified highest ranked non-common word.

12. The computer program product of claim 10, wherein to determine whether to update the identified entry based on the retrieved response method further comprises one or more of the following program instructions, stored on the one or more computer readable storage media, to:
determine the retrieved response method is the historical activity learning method;
determine a stimulus and an associated response occur;
add the determined stimulus and the associated response to a historical data repository that includes one or more previous instances of determined stimuli and associated responses;
calculate a frequency of occurrence associated with one or more individual instances of the one or more previous instances of determined stimuli and the associated responses within the historical data repository;
rank the calculated frequency of occurrence of the one or more individual instances of the one or more previous instances of determined stimuli and the associated responses within the historical data repository;
select a highest ranked frequency of occurrence stimulus and associated response based on the ranked calculated frequency of occurrence;
retrieve a stimulus and a response associated with the identified entry;
determine whether the retrieved stimulus and retrieved response associated with the identified entry do not match the selected highest ranked frequency of occurrence stimulus and the associated response; and
responsive to determining the retrieved stimulus and retrieved response associated with the identified entry do not match the selected highest ranked frequency of occurrence stimulus and the associated response, update the retrieved stimulus and the retrieved response associated with the identified entry with the selected highest ranked frequency of occurrence stimulus and the associated response.

13. The computer program product of claim 8, wherein to identify the stimulus associated with the identified identity further comprises one or more of the following program instructions, stored on the one or more computer readable storage media, to:
retrieve the input data associated with the identified identity;
receive data wherein the data includes one of the following: a proximity, a voice data associated with the identified individual, and an action from a user associated with the computing device; and
determine a match occurs within the received data and the retrieved input data based on a comparison of the received data to the retrieved input data.

14. The computer program product of claim 8 wherein the determined location includes a geo-fence.

15. A computer system for providing a response based on situational context, the computer system comprising:
one or more computer processors, one or more computer readable storage media, and program instructions stored on the computer readable storage media for execution by at least one of the one or more processors, the program instructions comprising:
program instructions to determine, by one or more computer processors, that an individual is within a proximity of a computing device;
program instructions to identify, by one or more computer processors, an identity associated with the determined individual within the proximity of the computing device;
program instructions to determine, by one or more computer processors, a location associated with the identified identity;
program instructions to identify, by one or more computer processors, an entry within a table based, at least in part, on the identified identity, the determined location, and input data associated with the identified identity, wherein program instructions to identify the input data comprise program instructions to measure displacement of an object within an electric field;
program instructions to generate, by one or more computer processors, a suggested response based on the identified input data associated with the identified identity;
program instructions to determine, by one or more computer processors, a frequency of occurrence associated with the suggested response, wherein the suggested response is an identified keyword;
in response to determining the frequency of occurrence associated with the suggested response, program instructions to update, by one or more computer processors, the suggested response within the identified entry;

in response to program instructions to generate the suggested response, by one or more computer processors, displaying recognition information and the suggested response when the identified identity enters the determined location on at least one digital device associated with another individual; and program instructions to navigate the another individual using an adaptive machine learning algorithm, wherein the adaptive machine learning algorithm analyzes the input data associated with the identified identity and the determined location of the identified identity.

16. The computer system of claim 15, wherein to determine that the individual is within the proximity of the computing device further comprises one or more of the following program instructions, stored on the one or more computer readable storage media, to:

determine a physical orientation associated with the computing device;

receive data associated with the individual via a peripheral associated with the computing device;

identify a directional component associated with the received data with respect to the determined physical orientation associated with the computing device, wherein the directional component translates to an angle with respect to the determined physical orientation of the computing device;

determine whether the identified directional component associated with the received data is greater than a predefined forward viewing angle; and responsive to determining the identified directional component associated with the received data is not greater than the predefined forward viewing angle, determine the individual is within proximity of the computing device.

17. The computer system of claim 15, further comprising one or more of the following program instructions, stored on the one or more computer readable storage media, to:

retrieve a response method associated with the identified entry; wherein the response method includes one of the following: a static method, a keyword learning method, and a historical activity learning method; and determine whether to update the identified entry based on the retrieved response method.

18. The computer system of claim 17, wherein to determine whether to update the identified entry based on the retrieved response method further comprises one or more of the following program instructions, stored on the one or more computer readable storage media, to:

determine the retrieved response method is the keyword learning method;

record voice data associated with the identified identity;

identify one or more non-common words within the recorded voice data based on a dictionary that identifies common words;

calculate a frequency of occurrence associated with each one of the one or more non-common words;

rank the identified one or more non-common words based on the calculated frequency of occurrence associated with each one of the one or more non-common words;

identify a highest ranked non-common word within the ranked identified one or more non-common words;

retrieve the keyword from the identified entry;

identify the retrieved keyword within the one or more non-common words;

determine whether the frequency of occurrence associated with the identified keyword within the one or more non-common words is less than the frequency of occurrence of the identified highest ranked non-common word; and responsive to determining the frequency of occurrence associated with the identified keyword within the one or more non-common words is less than the frequency of occurrence of the identified highest ranked non-common word, update the identified keyword within the identified entry with the identified highest ranked non-common word.

19. The computer system of claim 17, wherein to determine whether to update the identified entry based on the retrieved response method further comprises one or more of the following program instructions, stored on the one or more computer readable storage media, to:

determine the retrieved response method is the historical activity learning method;

determine a stimulus and an associated response occur;

add the determined stimulus and the associated response to a historical data repository that includes one or more previous instances of determined stimuli and associated responses;

calculate a frequency of occurrence associated with one or more individual instances of the one or more previous instances of determined stimuli and the associated responses within the historical data repository;

rank the calculated frequency of occurrence of the one or more individual instances of the one or more previous instances of determined stimuli and the associated responses within the historical data repository;

select a highest ranked frequency of occurrence stimulus and associated response based on the ranked calculated frequency of occurrence;

retrieve a stimulus and a response associated with the identified entry;

determine whether the retrieved stimulus and retrieved response associated with the identified entry do not match the selected highest ranked frequency of occurrence stimulus and the associated response; and responsive to determining the retrieved stimulus and retrieved response associated with the identified entry do not match the selected highest ranked frequency of occurrence stimulus and the associated response, update the retrieved stimulus and the retrieved response associated with the identified entry with the selected highest ranked frequency of occurrence stimulus and the associated response.

20. The computer system of claim 15, wherein to identify the stimulus associated with the identified identity further comprises one or more of the following program instructions, stored on the one or more computer readable storage media, to:

retrieve the input data associated with the identified identity;

receive data wherein the data includes one of the following: a proximity, a voice data associated with the identified individual, and an action from a user associated with the computing device; and determine a match occurs within the received data and the retrieved input data based on a comparison of the received data to the retrieved input data.

* * * * *